US010081232B2

(12) United States Patent
Ogawa

(10) Patent No.: US 10,081,232 B2
(45) Date of Patent: Sep. 25, 2018

(54) WEATHERSTRIP ASSEMBLY FOR A VEHICLE

(71) Applicant: Nishikawa Rubber Co., Ltd., Hiroshima (JP)

(72) Inventor: Hirofumi Ogawa, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 159 days.

(21) Appl. No.: 14/724,406

(22) Filed: May 28, 2015

(65) Prior Publication Data
US 2015/0360547 A1 Dec. 17, 2015

(30) Foreign Application Priority Data

Jun. 11, 2014 (JP) ................................. 2014-120729
Jun. 11, 2014 (JP) ................................. 2014-120747

(51) Int. Cl.
*B60J 5/04* (2006.01)
*B60J 10/84* (2016.01)
*B60J 10/86* (2016.01)
*B60J 10/21* (2016.01)
*B60J 10/25* (2016.01)
*B60J 10/40* (2016.01)

(52) U.S. Cl.
CPC ............ *B60J 5/0479* (2013.01); *B60J 10/21* (2016.02); *B60J 10/25* (2016.02); *B60J 10/40* (2016.02); *B60J 10/84* (2016.02); *B60J 10/86* (2016.02); *B60J 10/87* (2016.02)

(58) Field of Classification Search
CPC ........... B60J 5/0479; B60J 10/84; B60J 10/87
USPC .............................. 49/475.1; 296/147, 146.1
See application file for complete search history.

(56) References Cited

U.S. PATENT DOCUMENTS

| 4,561,690 | A | * | 12/1985 | Shinjo | B60J 5/0409 |
| | | | | | 292/336 |
| 6,039,384 | A | * | 3/2000 | Schulte | B60J 5/0402 |
| | | | | | 296/146.2 |
| 6,332,641 | B1 | * | 12/2001 | Okana | B60J 5/0425 |
| | | | | | 296/146.6 |
| 2011/0252707 | A1 | * | 10/2011 | Masumoto | B60J 5/0479 |
| | | | | | 49/476.1 |
| 2012/0159858 | A1 | * | 6/2012 | Mori | B60J 10/79 |
| | | | | | 49/476.1 |
| 2012/0161463 | A1 | * | 6/2012 | Mori | B60J 10/84 |
| | | | | | 296/107.04 |

(Continued)

FOREIGN PATENT DOCUMENTS

JP 2000-219052 A 11/2011
JP 04930788 B2 5/2012

*Primary Examiner* — Gregory J Strimbu
(74) *Attorney, Agent, or Firm* — Alston & Bird LLP

(57) ABSTRACT

First and second fins extending toward a second-closing door are provided at an upper end of a side-edge seal of a first-closing door of a double door of a vehicle. When the first-closing door is closed, the first fin overlaps the body-side seal, and the second fin overlaps an outer surface of the vehicle body outside the body-side seal. When the second-closing door is closed, an inner surface of the second-closing door abuts on the body-side seal and extends along the side-edge seal. A seal portion of the second-closing door abuts on the outer surface of the vehicle body outside the body-side seal and extends along the side-edge seal. The first and second fins are deformed independently from each other.

7 Claims, 17 Drawing Sheets

(56) References Cited

U.S. PATENT DOCUMENTS

| | | | | |
|---|---|---|---|---|
| 2013/0019538 | A1* | 1/2013 | Watson | B60J 10/0031 49/484.1 |
| 2014/0049067 | A1* | 2/2014 | Kasuya | B60R 13/043 296/146.5 |
| 2015/0210219 | A1* | 7/2015 | Watanabe | B60R 13/04 280/163 |
| 2015/0251529 | A1* | 9/2015 | Ide | B60J 10/002 49/476.1 |
| 2015/0273993 | A1* | 10/2015 | Sobue | B60J 10/081 296/146.9 |
| 2015/0360547 | A1* | 12/2015 | Ogawa | B60J 10/0045 49/368 |

\* cited by examiner

WEATHERSTRIP ASSEMBLY FOR A VEHICLE

CROSS-REFERENCE TO RELATED APPLICATION

This application claims priority to and the benefit of Japanese Patent Application Nos. 2014-120729 and 2014-120747, both filed on Jun. 11, 2014, the disclosures of which as are hereby incorporated herein by reference in their entireties.

BACKGROUND

A generally known double door for an opening of a vehicle body (e.g., an opening of a vehicle cabin or a luggage compartment) includes a first-closing door closed first, and a second-closing door closed later.

For example, as Japanese Unexamined Patent Publication No. 2011-219052 discloses, this type of vehicle includes a body-side seal, a side-edge seal, and a second-closing seal. The body-side seal is provided along the periphery of an opening of a vehicle body, and protrudes outside the vehicle. The side-edge seal extends vertically along the front side edge of a first-closing door, and protrudes outside the vehicle. The second-closing seal is provided along the periphery of a second-closing door, and protrudes inside the vehicle.

When the first-closing door is closed, the inner surface of the first-closing door abuts on the body-side seal. As viewed from the outer surface of the vehicle body, the side-edge seal of the first-closing door and the remaining portion of the body-side seal form a frame-like sealing means for the periphery of the second-closing door. When the second-closing door is closed, the periphery of the inner surface of the second-closing door abuts on the frame-like sealing means. On the other hand, the second-closing seal abuts on the outer surface around the opening of the vehicle body and the outer surface of the first-closing door outside the frame-like sealing means.

In this case, the inner surface of the second-closing door abuts and runs on the side-edge seal of the first-closing door from the body-side seal. The second-closing seal of the second-closing door runs once on the side-edge seal from the outer surface of the vehicle body and abuts on the outer surface of the first-closing door. Japanese Patent No. 4930788 discloses providing a lip for a seal of a first-closing door at a lower end on a side edge of the first-closing door to improve sealing performance at the portion of a seal of a second-closing door running on the seal of the first-closing door from the outer surface of a vehicle body. This lip overlaps the outer surface of the vehicle body outside the vehicle. When the second-closing door is closed, the seal of the second-closing door runs on the seal of the first-closing door from the lip.

On the other hand, Japanese Unexamined Patent Publication No. 2011-219052 discloses guiding water, which has entered a hollow seal portion of a weatherstrip from the upper part of the hollow seal portion, inside the first-closing door (the gap between inner and outer panels) from the lower end of the hollow seal portion. The hollow seal portion extends vertically along the overlap between the first-closing door and a second-closing door. A slit for taking out a core is cut in a portion molded in a mold above the hollow seal portion. The water enters the hollow seal portion through the slit.

In order to improve sealing performance at the portion of the second-closing seal running on the side-edge seal from the outer surface of the vehicle body at the upper side-edge corner of the first-closing door, an upper edge of the side-edge seal preferably has a seal-side fin of which thickness gradually decreases toward the second-closing door. That is, the second-closing seal runs on the body of the side-edge seal from the seal-side fin.

However, assume that an inner-side fin is provided at the portion of the inner surface of the second-closing door running on the side-edge seal from the body-side seal at the upper side-edge corner of the first-closing door, and this inner-side fin extends from the side-edge seal toward the second-closing door to be a single continuous piece with the seal-side fin. If the inner surface of the second-closing door runs on the side-edge seal from this inner-side fin, the sealing performance of the inner-side fin and the seal-side fin, which continuously extends from the inner-side fin, may be badly influenced.

Specifically, when the second-closing door is closed, the body-side seal and the inner-side fin overlapping the body-side seal, are pressed and deformed by the inner surface of the second-closing door. The seal-side fin is deformed or displaced by the deformation of the inner-side fin. The body-side seal is not always deformed in the same manner when the second-closing door is closed. Thus, the inner-side fin is also deformed differently, and accordingly, the position or the condition of the seal-side fin may often change. As such, if the abutting state of the seal-side fin on the outer surface of the body changes according to the deformation of the inner-side fin, the sealing performance of the second-closing seal at the door by is badly influenced.

At the portion of the above-described second-closing seal running on the side-edge seal from the outer surface of the vehicle body, a small gap is formed between the second-closing seal and the outer surface of the vehicle body. Thus, if a vehicle is in long rain or in strong wash water, water may leak into the vehicle through the small gap.

To address the problem, it is conceivable to guide leaking water inside a door by using a hollow seal portion of a weatherstrip as described in Japanese Unexamined Patent Publication No. 2011-219052. However, in this case, a flange connecting inner and outer panels at the lower end of the door is wet by the water. Since this flange is hardly coated, the wet tends to cause rusting.

SUMMARY

It is an objective of the present disclosure to improve sealing performance at a double door of a vehicle. Another objective of the present disclosure is to solve the problem of rusting due to leaking water.

In order to achieve the objectives, the present disclosure describes bowing a fin closer to a second-closing seal and a fin closer to an inner surface of a second-closing door independently from each other. Details will be described below.

A weatherstrip described here is for a vehicle including a vehicle body with an opening opened and closed using a double door of a first-closing door and a second-closing door. The weatherstrip includes a body-side seal provided along a periphery of the opening of the vehicle body and protruding outside the vehicle; a side-edge seal provided along a side edge of the first-closing door and protruding outside the vehicle; and a second-closing seal provided along a periphery of the second-closing door and protruding inside the vehicle. A first fin and a second fin extending toward the second-closing door are provided at at least one of ends of the side-edge seal of the first-closing door. When the first-closing door is closed, the first fin overlaps the body-side seal, and the second fin overlaps an outer surface of the vehicle body peripheral to the body-side seal. When the second-closing door is closed, an inner surface of the second-closing door abuts on the body-side seal to run on a body of the side-edge seal of the first-closing door from the first fin, and the second-closing seal abuts on the outer surface of the vehicle body peripheral to the body-side seal to run on the body of the side-edge seal of the first-closing door from the second fin. At least tips of the first and second fins are deformed independently from each other.

According to this weatherstrip, when the first-closing door is closed, the inner surface of the first-closing door abuts on the body-side seal. As viewed from the outer surface of the vehicle body, the side-edge seal of the first-closing door and the body-side seal form a frame-like sealing means for the periphery of the second-closing door. When the second-closing door is closed, the inner surface of the second-closing door abuts on the body-side seal and runs on the body of the side-edge seal of the first-closing door from the first fin. At the periphery of the body-side seal, the second-closing seal abuts on the outer surface of the vehicle body and runs on the body of the side-edge seal of the first-closing door from the second fin.

When the second-closing door is closed, the body-side seal and the first fin overlapping the body-side seal are deformed. While the first fin is not always deformed in the same manner, the second fin is configured to be deformed independently from the first fin and thus the deformation of the first fin less influences the second fin. Therefore, both the first and second fins effectively work to improve sealing performance at the portion of the inner surface of the second-closing door running on the side-edge seal from the body-side seal, and the portion of the second-closing seal running on the side-edge seal from the outer surface of the vehicle body.

In a preferred embodiment, the first and second fins are divided from each other and protrude from the body of the side-edge seal of the first-closing door to extend toward the second-closing door. Then, the first and second fins are deformed independently from each other to prevent the deformations of the first and second fins from influencing each other. This advantageously improves sealing performance.

In an exemplary embodiment, thicknesses of the first and second fins gradually decrease toward the tips. A gap is hardly generated between the inner surface of the second-closing door and the body-side seal at the tip of the first fin, while a gap is hardly generated between the second-closing seal and the outer surface of the vehicle body at the tip of the second fin. This advantageously improves sealing performance.

In an exemplary embodiment, when the second-closing door is closed, an upper seal portion of the second-closing seal along an upper edge of the second-closing door abuts on the outer surface of the vehicle body to run on the side-edge seal of the first-closing door from the outer surface of the vehicle body, and a side seal portion of the second-closing seal along a top-side edge of the second-closing door abuts on the outer surface of the first-closing door positioned closer to a base end of the first-closing door than the side-edge seal, that is, farther away from the side edge of the first-closing door than the side-edge seal. The side-edge seal of the first-closing door includes a water receiver and a drainage ditch. The water receiver receives water dropping along the outer surface of the vehicle body from a portion where the upper seal portion of the second-closing seal runs on the side-edge seal of the first-closing door from the outer surface of the vehicle body. The drainage ditch drains the water from the water receiver to the outer surface of the first-closing door positioned closer to the base end of the first-closing door than the side seal portion of the second-closing seal.

According to this embodiment, at the portion of the upper seal portion of the second-closing seal running on the side-edge seal of the first-closing door from the outer surface of the vehicle body, even if a small gap is generated between the upper seal portion and the outer surface of the vehicle body, the water leaking inside the side-edge seal (inside the vehicle) along the outer surface of the vehicle body from the gap is received by the water receiver and does not enter the vehicle.

Then, the water received by the water receiver is drained by the drainage ditch to the outer surface at the portion closer to the base end of the first-closing door than the side seal portion of the second-closing seal. Thus, the water leaking from the gap does not enter the inside of the second-closing door (the inside of the vehicle), or touches a flange of the first-closing door. This advantageously prevents or reduces rusting of door panels.

In an exemplary embodiment, when the second-closing door is closed, the water receiver of the side-edge seal is positioned closer to the base end of the second-closing door than the side seal portion of the second-closing seal. The side-edge seal includes a drain hole and a bead. The drain hole extends obliquely downward toward the base end of the first-closing door from the water receiver, and is exposed to a surface of the side-edge seal attached to the outer surface of the first-closing door. The bead is provided on the attached surface and extends obliquely downward from a lower end of the drain hole toward the base end of the first-closing door. The bead on the attached surface abuts on the outer surface of the first-closing door such that the attached surface, the outer surface of the first-closing door, and the bead form a drainage space forming the drainage ditch together with the drain hole.

According to this embodiment, the drainage ditch is configured to extend obliquely downward. Then, leaking water received by the water receiver in the position closer to the base end of the second-closing door than the side seal portion of the second-closing seal is drained to the outer surface at the portion closer to the base end of the first-closing door than the side seal portion of the second-closing seal. This prevents leaking water from entering the inside of the second-closing door (the inside of the vehicle). In addition, at the lower portion of the drainage ditch, a bead continuous with the lower end of the drain hole is provided on the attached surface of the side-edge seal. The attached surface, the outer surface of the first-closing door, and the bead form the drainage space to drain the water to the outer surface of the first-closing door without using a side-edge seal with a complicated attached surface.

In an exemplary embodiment, a weatherstrip of a vehicle including a vehicle body with an opening opened and closed using a double door of a first-closing door and a second-closing door. The weatherstrip includes a side-edge seal provided along a side edge of the first-closing door and protruding outside the vehicle; and a second-closing seal provided along a periphery of the second-closing door and protruding inside the vehicle. When the second-closing door is closed, an upper seal portion of the second-closing seal along an upper edge of the second-closing door abuts on an outer surface of the vehicle body to run on the side-edge seal of the first-closing door from the outer surface of the vehicle body, and a side seal portion of the second-closing seal along a top-side edge of the second-closing door abuts on an outer surface of the first-closing door positioned closer to a base end of the first-closing door than the side-edge seal. The side-edge seal of the first-closing door includes a water receiver and a drainage ditch. The water receiver receives water dropping along the outer surface of the vehicle body from a portion of the upper seal portion of the second-closing seal running on the side-edge seal of the first-closing door from the outer surface of the vehicle body. The drainage ditch drains the water from the water receiver to an outer surface of the first-closing door positioned closer to the base end of the first-closing door than the side seal portion of the second-closing seal.

In an exemplary embodiment, when the second-closing door is closed, the water receiver of the side-edge seal is positioned closer to the base end of the second-closing door than the side seal portion of the second-closing seal. The side-edge seal includes a drain hole and a bead. The drain hole extends obliquely downward toward the base end of the first-closing door from the water receiver, and is exposed to a surface of the side-edge seal attached to the outer surface of the first-closing door. The bead is provided on the attached surface and extends obliquely downward from a lower end of the drain hole toward the base end of the first-closing door. The bead on the attached surface abuts on the outer surface of the first-closing door such that the attached surface, the outer surface of the first-closing door, and the bead form a drainage space forming the drainage ditch together with the drain hole.

DETAILED DESCRIPTION

Embodiments of the present disclosure will be now described with reference to the drawings. The following embodiments are merely examples in nature and are not intended to limit the scope, applications, and use of the present disclosure.

Figure 1:
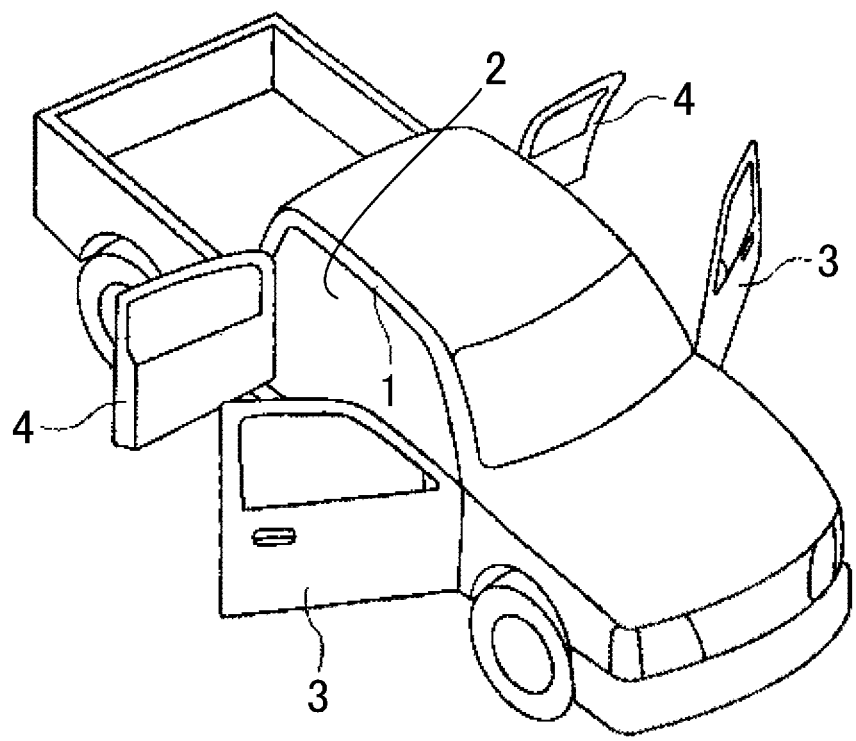
FIG. 1 is a perspective view of a vehicle.

A vehicle shown in FIG. 1 includes a double door of a front door 3 and a rear door 4 to open and close an opening 2 in a side of a vehicle body 1. A driver or passenger gets on and off a vehicle cabin through the opening 2. According to this embodiment, the rear door 4 is closed first, and then the front door 3 is closed. No pillar is provided to divide the opening 2 into the first-closing rear door 4 side and the second-closing front door 3 side.

The present disclosure is also applicable to the case where an opening for a luggage compartment in a side of a vehicle body is opened and closed with a first-closing door and a second-closing door, and the case where an opening for a luggage compartment cut in the back surface of a vehicle body is opened and closed with a double door of a first-closing door and a second-closing door, or other cases.

The embodiments of the present disclosure will be described in detail. In the following description, sealing members are made of a rubber-like elastic material such as EPDM or thermoplastic elastomer.

Relationship between Seals and Body 1, Door 3, and Door 4

Figure 2:
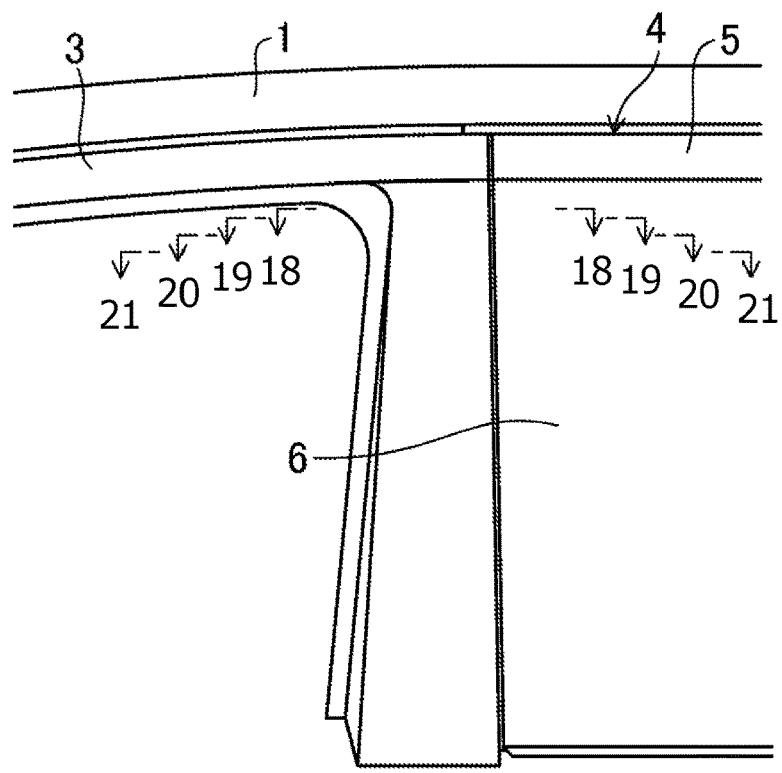
FIG. 2 is a side view illustrating part of a vehicle with front and rear doors closed.
Figure 3:
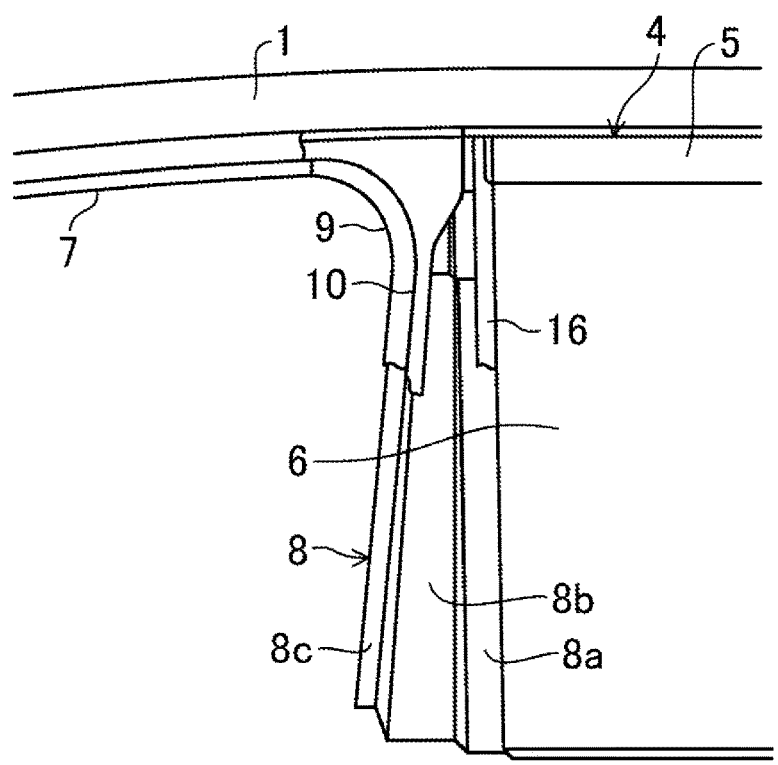
FIG. 3 corresponds to FIG. 2 but excludes a front door (i.e., a second-closing door).
Figure 4:
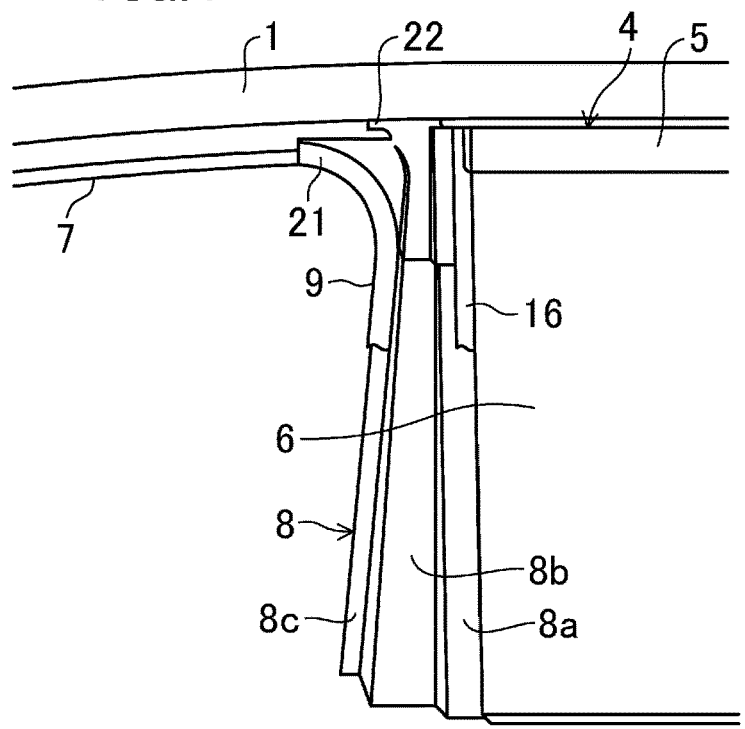
FIG. 4 corresponds to FIG. 3 but excludes a second-closing seal.
Figure 5:
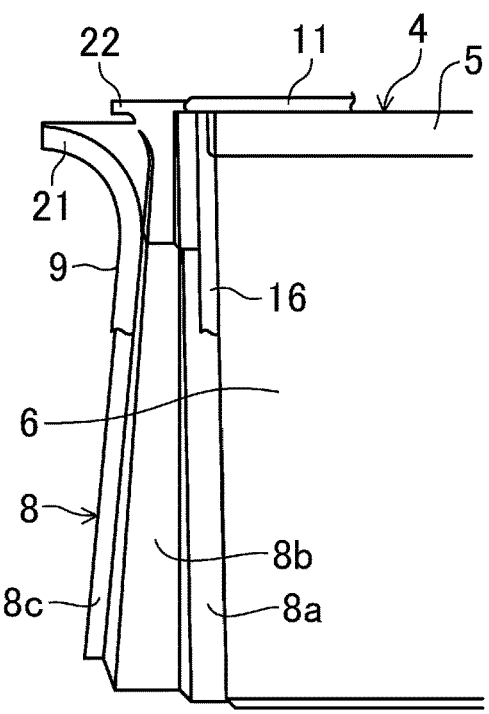
FIG. 5 corresponds to FIG. 4 but excludes a vehicle body.
Figure 6:
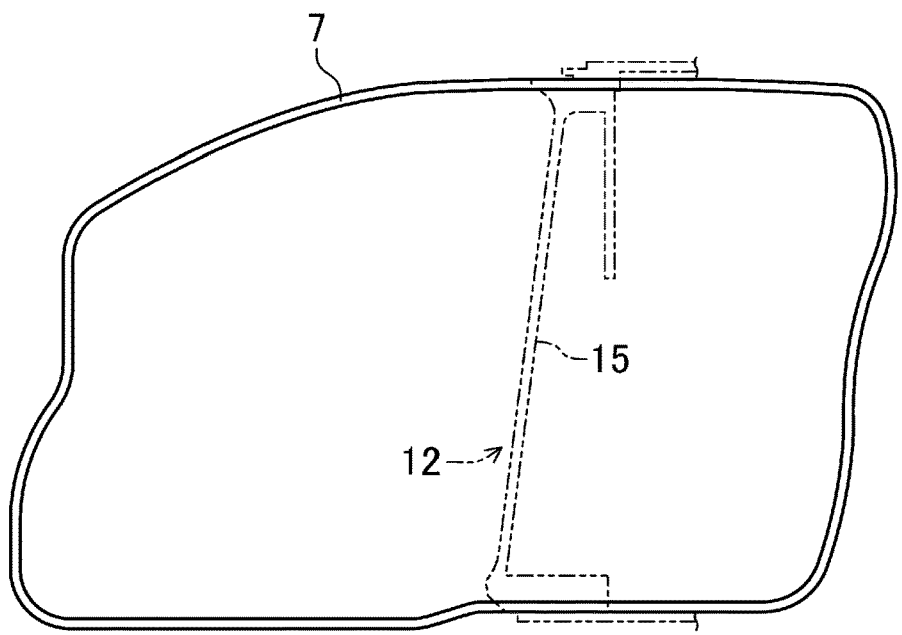
FIG. 6 is a front view illustrating an entire configuration of a body-side seal of a vehicle body.
Figure 7:
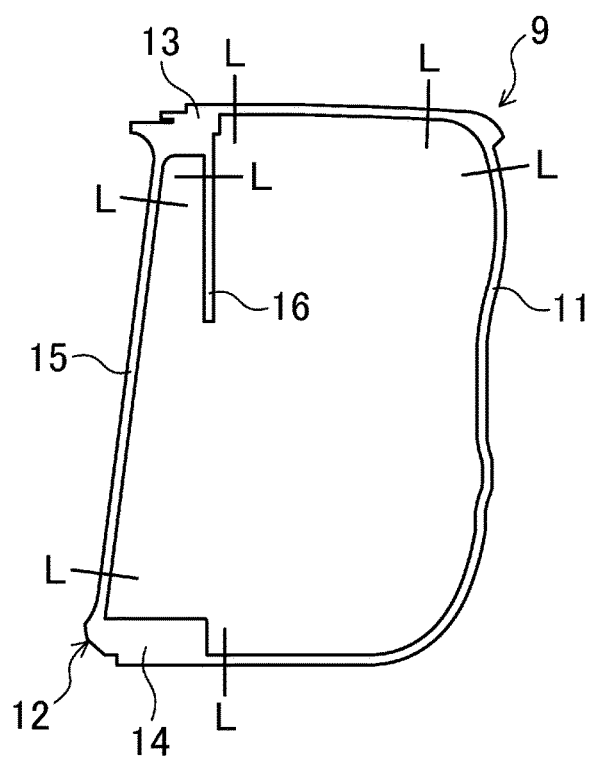
FIG. 7 is front view illustrating an entire configuration of a first-closing seal of a rear door (i.e., a first-closing door).

FIG. 2 illustrates that the front door 3 and the rear door 4 are closed. Reference numeral 5 of FIG. 2 denotes an upper end frame of the rear door 4. Reference numeral 6 denotes a window glass of the rear door 4. FIG. 3 corresponds to FIG. 2 but excludes the front door 3. FIG. 3 shows a body-side seal 7, a top-side frame 8 of the rear door 4, a first-closing seal 9, and a second-closing seal 10. The body-side seal 7 is provided along the periphery of the opening of the vehicle body 1 and is also shown in FIG. 6. The first-closing seal 9 is provided along the periphery of the first-closing rear door 4 and is also shown in FIG. 7. The second-closing seal 10 is provided along the periphery of the second-closing front door 3 and also shown in FIG. 8. FIG. 4 corresponds to FIG. 3 but excludes the second-closing seal 10. FIG. 5 corresponds to FIG. 4 but further excludes the vehicle body 1.

As shown in FIGS. 3-5, the outer shape of the top-side frame 8 of the rear door 4 has three steps. An edge 8a closer to the window glass 6 protrudes outside the vehicle. Then, an intermediate portion 8b, and an edge 8c closer to the front door 3 are recessed in this order inside the vehicle.

Entire Configurations of First-Closing Seal 9 and Second-Closing Seal 10

As shown in FIG. 7, the first-closing seal 9 includes an inner seal 11 and a side-edge seal 12. The inner seal 11 is provided along the upper edge of the door, the base-side (hinge-side) edge of the door, and the lower edge of the door, and protrudes inside the vehicle. The side-edge seal 12 is provided along the side edge of the door, and protrudes outside the vehicle. The upper corner of the inner seal 11 at the base end of the door is molded. The other portions are made by extrusion molding. The side-edge seal 12 includes an upper seal corner 13, a lower seal corner 14, and an intermediate seal portion 15 connecting the upper and lower seal corners 13 and 14 together. Furthermore, a sub-seal 16 is provided closer to the base end of the rear door 4 than the intermediate seal portion 15 so as to extend from the upper seal corner 13 to the position of a belt line of the vehicle. The upper and lower seal corners 13 and 14 of the first-closing seal 9 are molded. The other portions are made by extrusion molding. In FIG. 7, etc., lines L denote interfaces between the molded portions and the extrusion-molded portions.

Figure 8:
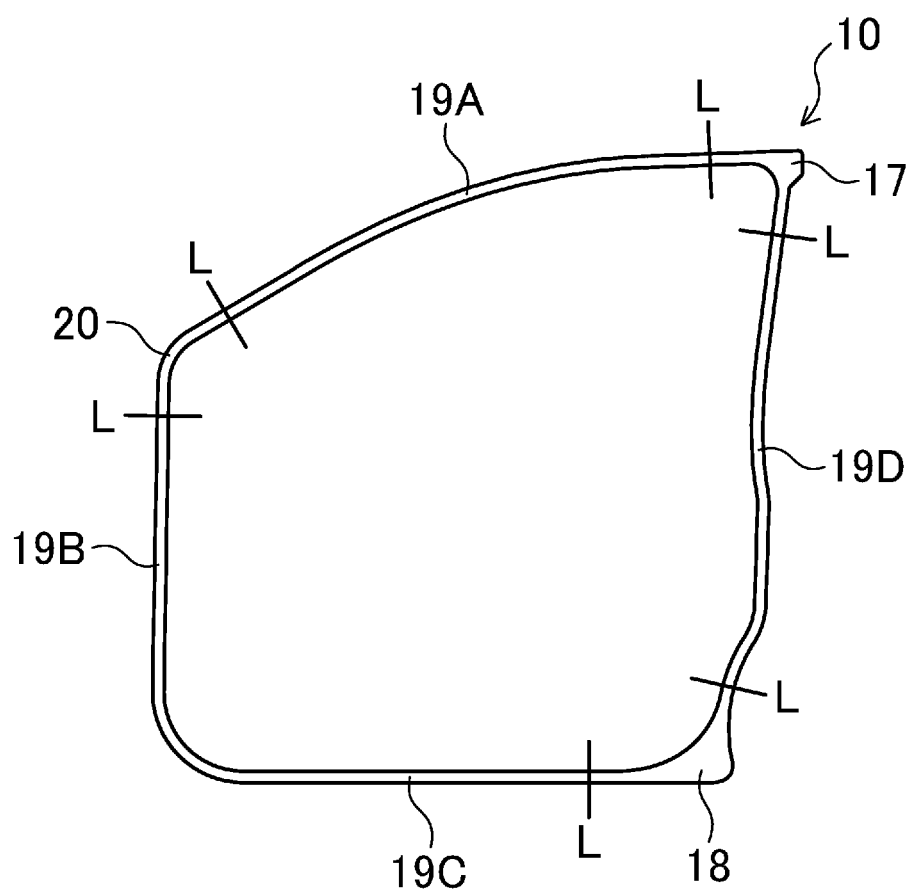
FIG. 8 is a front view illustrating an entire configuration of a second-closing seal of a front door.

As shown in FIG. 8, the second-closing seal 10 includes an upper side-edge seal corner 17, a lower side-edge seal corner 18, an upper base-side seal corner 20, a seal portion 19A, a seal portion 19B, a seal portion 19C, and a seal portion 19D. The seal corners 17, 18, and 20 are molded. The seal portion 19A is provided along the upper edge of the door. The seal portion 19B is provided along the base-side edge of the door. The seal portion 19C is provided along the lower edge of the door. The seal portion 19D is provided along the side edge of the door. The seal portions 19A-19D are made by extrusion molding. The second-closing seal 10 is attached to the inner surface of the front door 3 and protrudes inside the vehicle.

Upper Seal Corner 13 of First-Closing Seal 9

Figure 9:
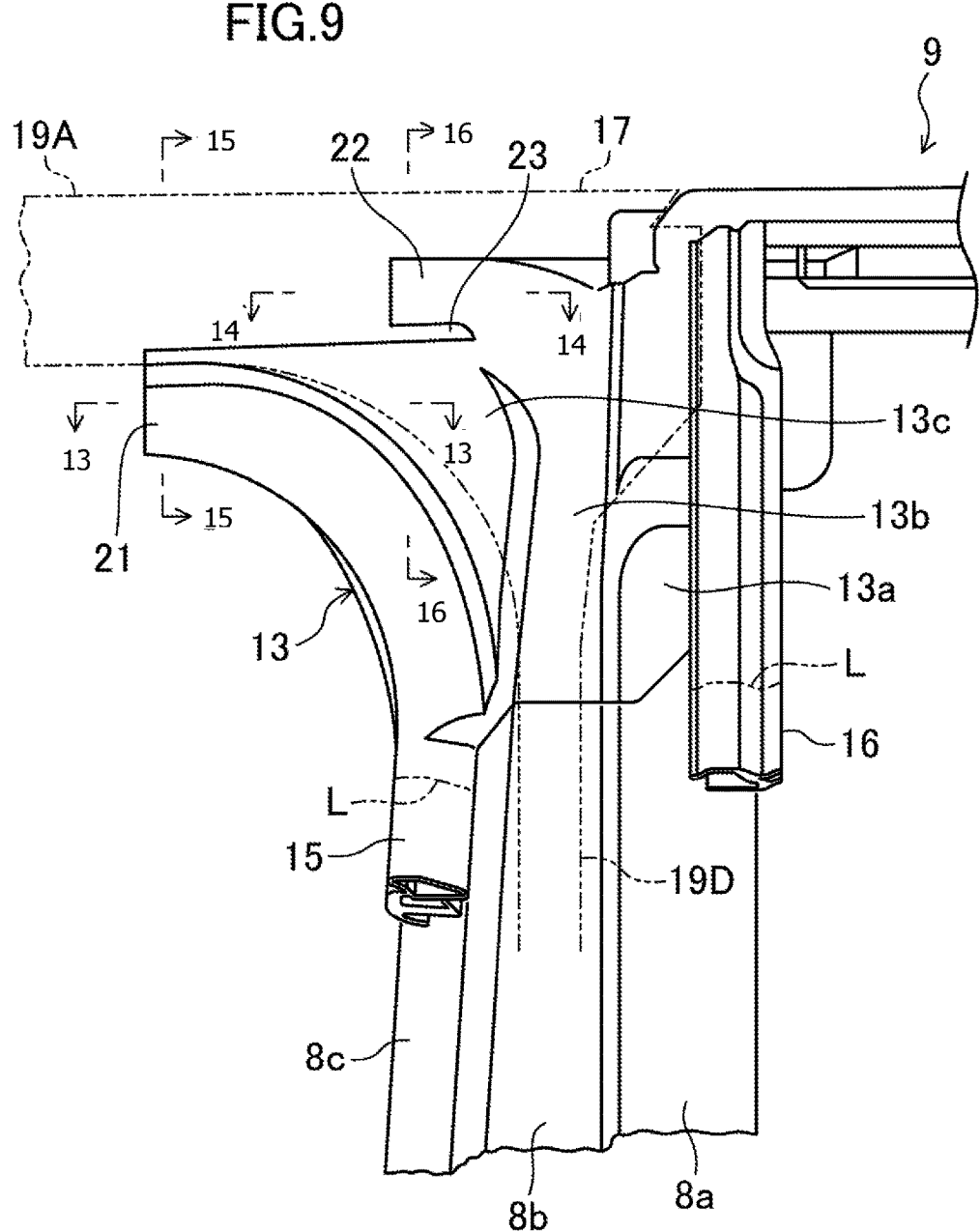
FIG. 9 is a front view of a corner of a first-closing seal.
Figure 10:
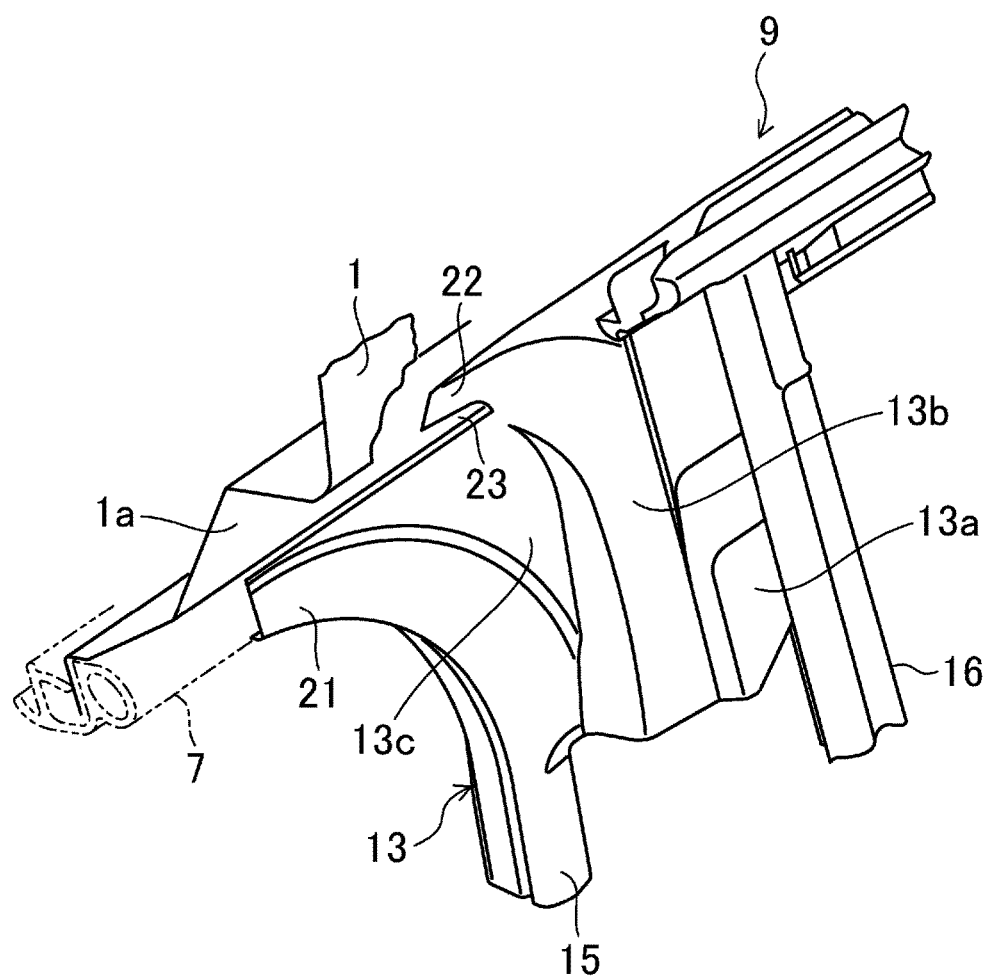
FIG. 10 is a perspective view of a corner of a first-closing seal.

The upper seal corner 13 of the first-closing seal 9 is attached to the outer surface of an upper top-side corner of the rear door 4. As shown in FIGS. 9 and 10, the seal corner 13 includes a base portion 13a, an intermediate portion 13b, and a top portion 13c. The base portion 13a is continuous with the sub-seal 16, and covers the edge 8a of the top-side frame 8 closer to the window glass 6 outside the vehicle. The intermediate portion 13b covers the intermediate portion 8b of the top-side frame 8 outside the vehicle. The top portion 13c covers the edge 8c of the top-side frame 8 closer to the front door 3 outside the vehicle. The thicknesses of the lower ends of the base portion 13a and the intermediate portion 13b gradually decrease as they go down. The top portion 13c is continuous with the intermediate seal portion 15.

The seal corner 13 includes a first fin 21 extending from an upper portion of the top portion 13c toward the front door 3. The first fin 21 overlaps the body-side seal 7 of the vehicle body 1 outside the vehicle when the rear door 4 is closed. The seal corner 13 also includes a second fin 22 extending from the upper end of the intermediate portion 13b toward the front door 3. The second fin 22 overlaps an outer surface 1a of the vehicle body 1 outside the body-side seal 7 when the rear door 4 is closed.

Note that the first and second fins 21 and 22 are divided from a body (the seal corner 13) of the side-edge seal 12 to extend toward the front door 3. Specifically, a slit 23 is provided between the second fin 22 and the top portion 13c (closer to the intermediate portion 13b in FIG. 9) of the seal corner 13, which is the base of the first fin 21. Thus, the first and second fins 21 and 22 are configured to be deformed independently from each other. The vertical width of the first fin 21 gradually deceases as it goes to the tip. The thickness of the first fin 21 gradually deceases as it goes to the tip. The thickness of the second fin 22 also gradually deceases as it goes to the tip.

As described above, according to this embodiment, while the fins 21 and 22 are extended and divided from the side-edge seal 12, a single integrated fin may be provided instead of the divided fins 21 and 22. However, as will be described below, the divided fins 21 and 22 are preferably provided in view of obtaining excellent sealing performance.

Upper Seal Corner 17 of Second-Closing Seal 10

Figure 11:
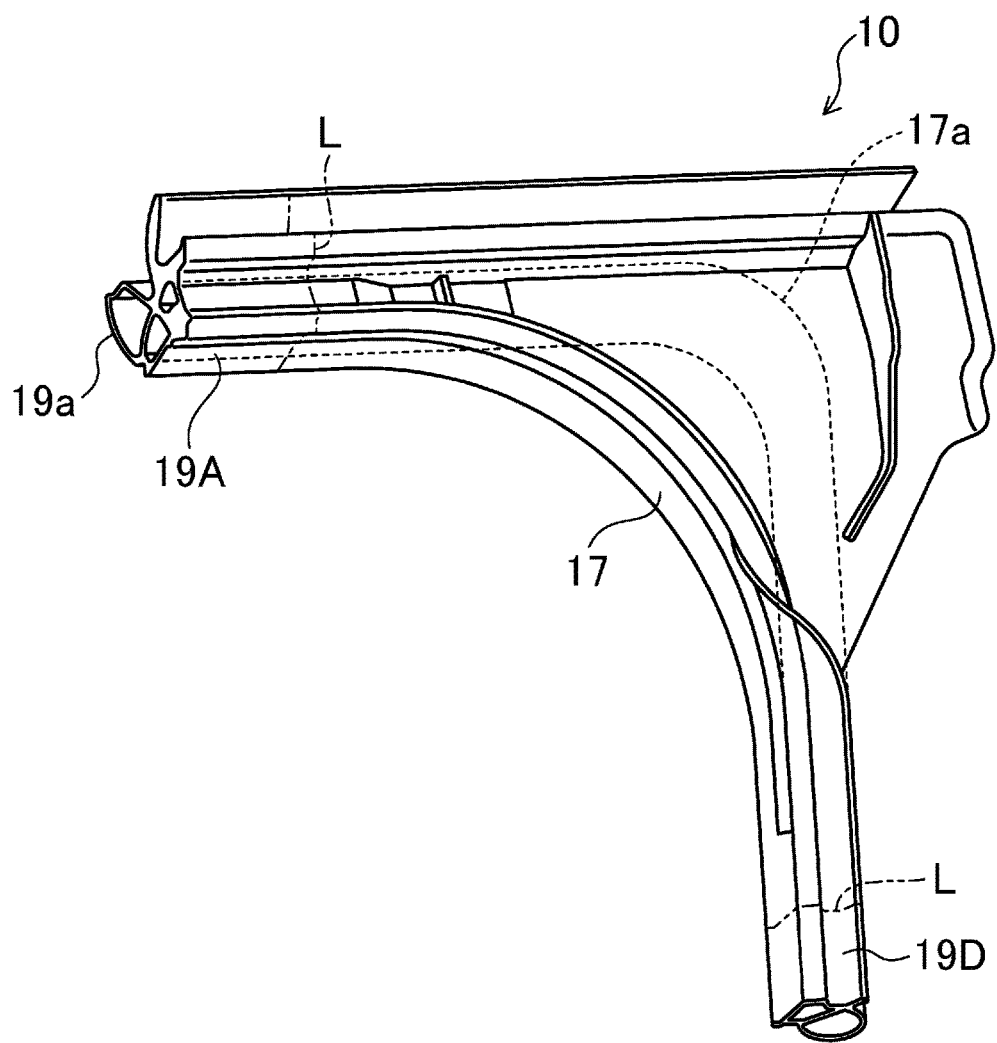
FIG. 11 is a perspective view of a corner of a second-closing seal.

The upper seal corner 17 of the second-closing seal 10 is attached to an inner surface of an upper top-side corner of the front door 3. As shown in FIGS. 9 and 11, this seal corner 17 is widely formed such that an upper portion of the seal corner 17 overlaps the base, intermediate, and top portions 13a-13c of the upper seal corner 13 of the first-closing seal 9 outside the vehicle. The width of the seal corner 17 gradually decreases as it goes down. The seal corner 17 extends downward along the outer surface of the intermediate portion 13b of the upper seal corner 13 of the first-closing seal 9, and is continuous with a seal portion 19D at the top of the door made by extrusion molding.

Figure 12:
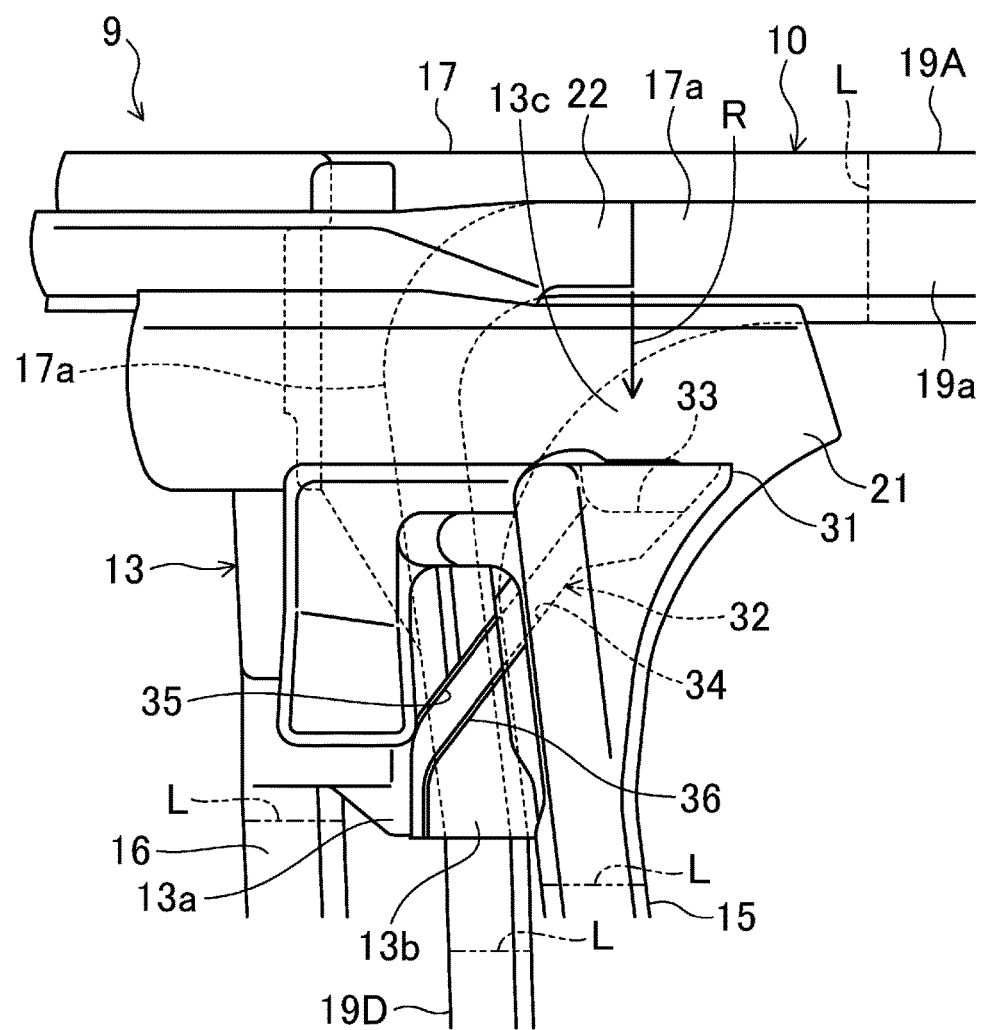
FIG. 12 is a back view of a corner of a first-closing seal.

The upper end of the seal corner 17 overlaps the second fin 22 of the first-closing seal 9 outside the vehicle. Specifically, as shown in FIG. 12, the seal portion 19A extending along the upper edge of the front door 3 has a hollow protrusion 19a protruding inside the vehicle. The hollow protrusion 19a is continuous with a hollow protrusion 17a of the seal corner 17 protruding inside the vehicle. The hollow protrusion 17a overlaps the second fin 22 of the first-closing seal 9 outside the vehicle.

Sealing Performance of Fins 21 and 22

When the rear door 4 is closed, the periphery of the inner surface of the rear door 4 (the upper edge of the door, the base end of the door, and the lower edge of the door) abuts on the body-side seal 7 of the vehicle body 1. On the other hand, the inner seal 11 of the first-closing seal 9 abuts on the outer surface 1a of the vehicle body 1 outside the body-side seal. As shown in FIG. 6, the side-edge seal 12 of the first-closing seal 9 extends from the upper side to the lower side of the body-side seal 7. As a result, the remaining portion of the body-side seal 7 at the front of the vehicle and the side-edge seal 12 form a frame-like sealing means for the periphery of the front door 3. As shown in FIG. 10, at the upper seal corner 13 of the first-closing seal 9, the first fin 21 overlaps the body-side seal 7 of the vehicle body 1 outside the vehicle, and the second fin 22 overlaps the outer surface 1a of the vehicle body 1.

Then, when the front door 3 is closed, the periphery of the inner surface of the front door 3 abuts on the frame-like sealing means formed of the body-side seal 7 of the vehicle body 1 and the side-edge seal 12 of the rear door 4. On the other hand, outside the frame-like sealing means, the seal portions 19A-19C of the second-closing seal 10 abut on the outer surface 1a of the vehicle body 1, and the seal portion 19D at the top of the front door 3 abuts on an outer surface of the top-side frame 8 of the rear door 4.

Figure 13:
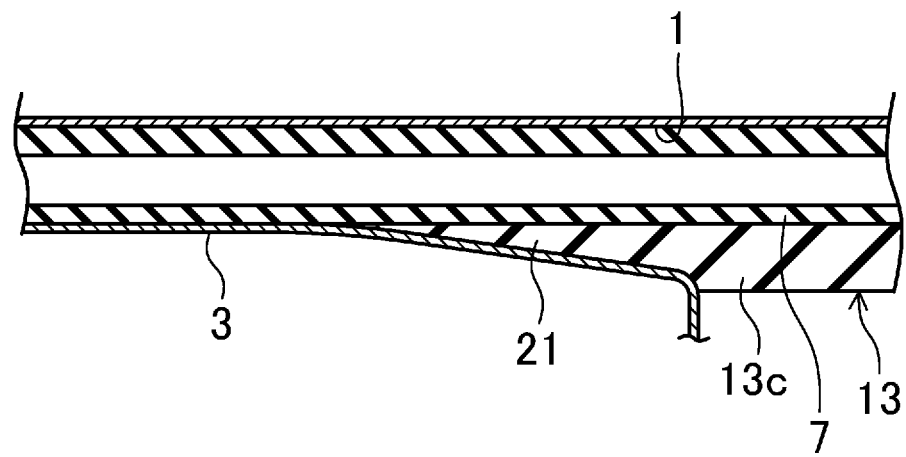
FIG. 13 is cross-sectional view taken along the line 13-13 of FIG. 9.
Figure 14:
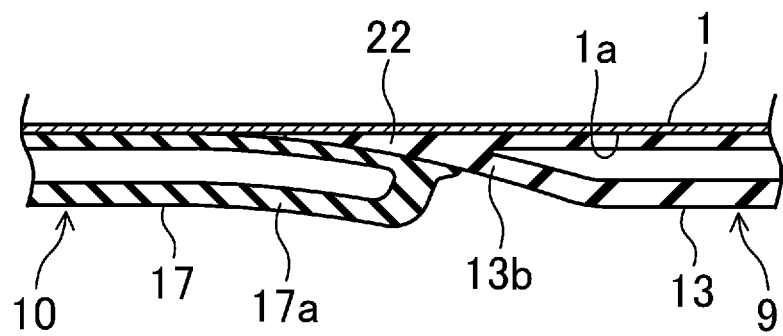
FIG. 14 is cross-sectional view taken along the line 14-14 of FIG. 9.

In this manner, as shown in FIG. 13, at the upper seal corner 13 of the first-closing seal 9, the inner surface of the front door 3 abutting on the body-side seal 7 of the vehicle body 1 runs on the top portion 13c of the seal corner 13 from the first fin 21. As shown in FIG. 14, the hollow protrusion 17a of the seal corner 17 of the second-closing seal 10 abutting on the outer surface 1a of the vehicle body 1 runs on the intermediate portion 13b of the seal corner 13 from the second fin 22 of the first-closing seal 9.

Figure 15:
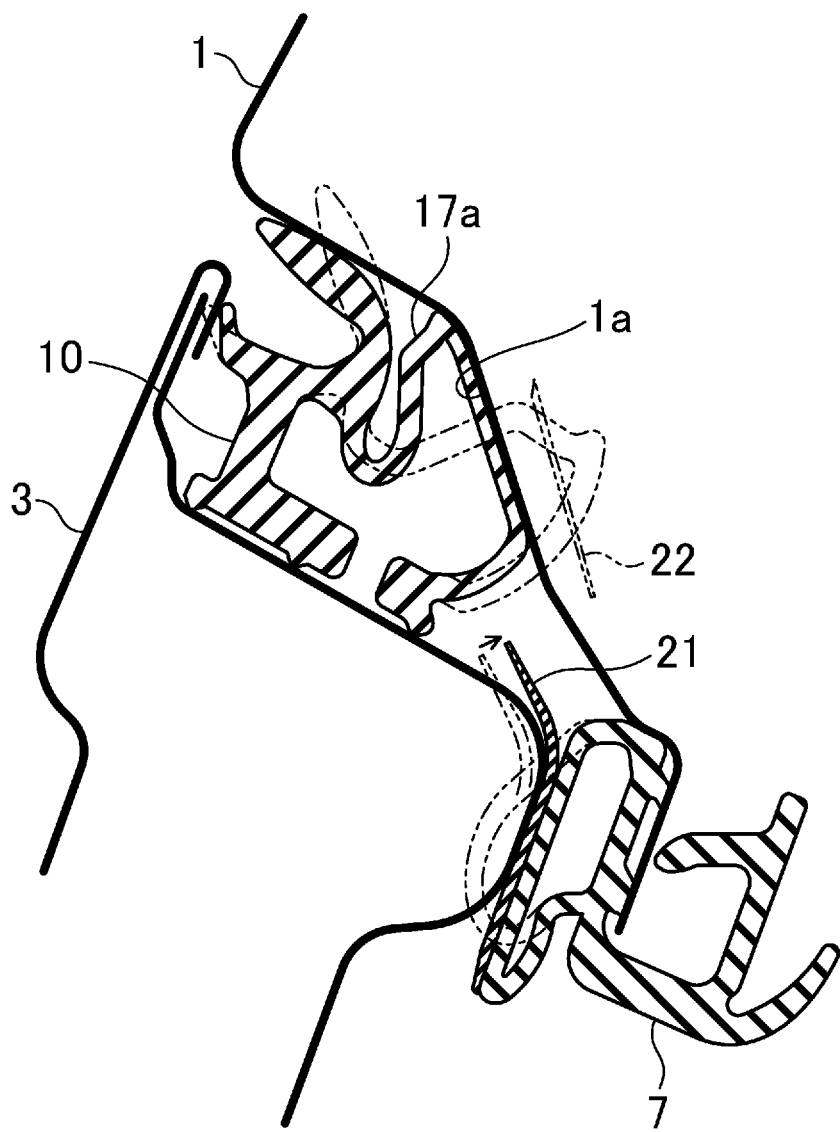
FIG. 15 is cross-sectional view taken along the line 15-15 of FIG. 9.

As shown in FIG. 15, when the front door 3 is closed, the body-side seal 7 of the vehicle body 1 and the first fin 21 overlapping the body-side seal 7 are pressed and deformed by the inner surface of the front door 3. The body-side seal 7 is not always deformed in the same manner when the front door 3 is closed. That is, the first fin 21 is deformed differently.

Figure 16:
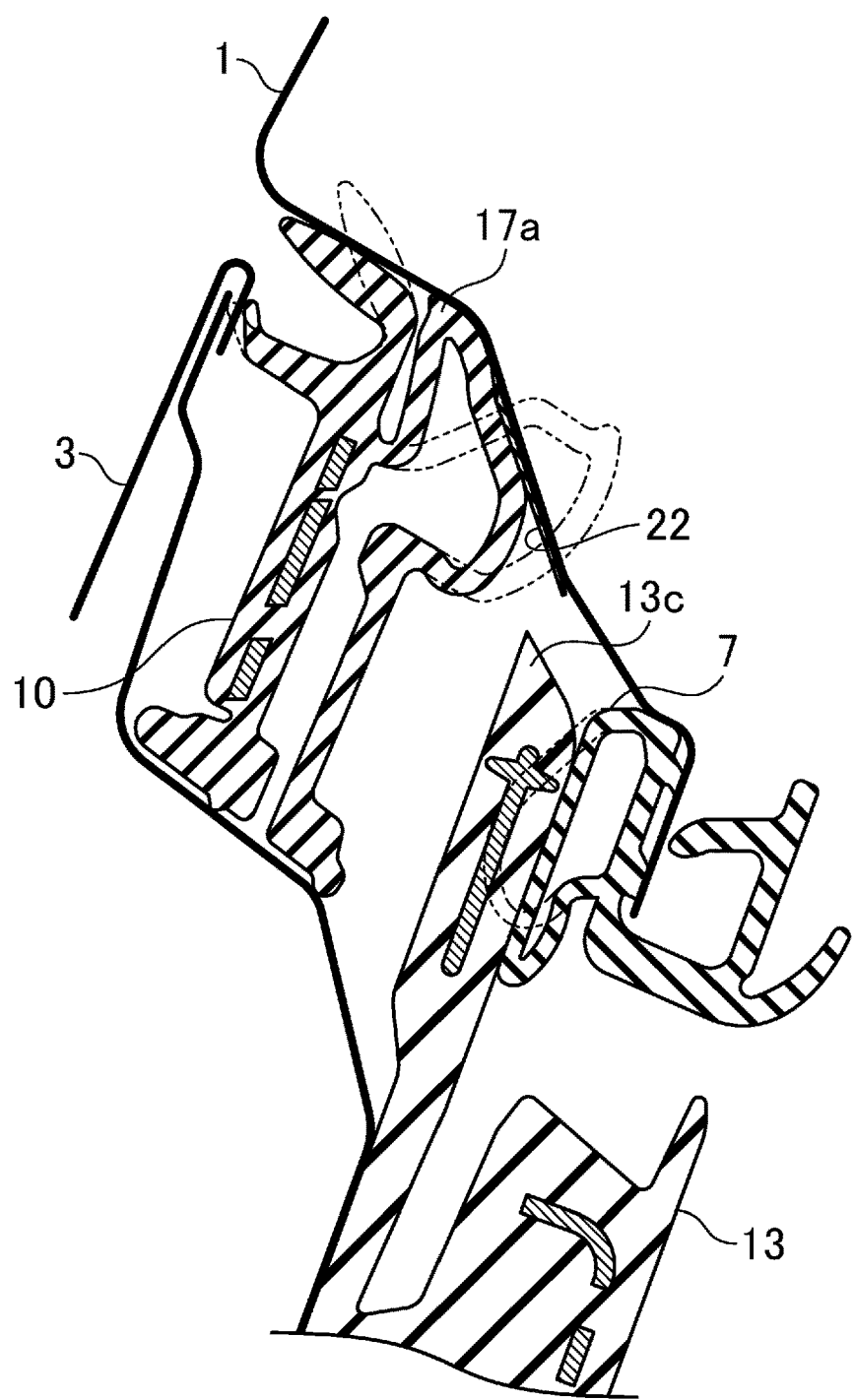
FIG. 16 is cross-sectional view taken along the line 16-16 of FIG. 9.

On the other hand, since the slit 23 is provided between the second fin 22 and the top portion 13c of the seal corner 13, the second fin 22 is not influenced by the deformation of the first fin 21 and is configured to be deformed independently from the first fin 21. Therefore, as shown in FIG. 16, when the front door 3 is closed, the second fin 22 is not displaced or abnormally deformed with the deformation of the first fin 21. The second fin 22 continues to abut on the outer surface 1a of the vehicle body 1 in an expected position.

At the portion of the inner surface of the front door 3 running on the first-closing seal 9 from the body-side seal 7 of the vehicle body 1, the first fin 21 improves the sealing performance. Similarly, at the portion of the second-closing seal 10 running on the first-closing seal 9 from the outer surface 1a of the vehicle body 1, the second fin 22 reliably improves the sealing performance.

Drainage Structure of Leaking Water

Next, a drainage structure of leaking water will be described. This drainage structure is not necessarily inseparable from the fines 21 and 22 extended and divided from the side-edge seal 12 described above.

As shown in FIG. 14, when the first-closing seal 9 is provided with the second fin 22 such that the second-closing seal 10 abutting on the outer surface 1a of the vehicle body 1 runs on the body of the first-closing seal 9 from the second fin 22, the sealing performance improves. However, if a vehicle is in long rain or in strong wash water, water may leak inside the door along the outer surface 1a of the vehicle body 1 through a small gap between the second-closing seal 10 and the outer surface of the vehicle body 1 at the top of the second fin 22.

Specifically, leaking water is indicated by an arrow R extending from the tip of the second fin 22 in FIG. 12. To address the leakage of water, a water receiver 31 and a drainage ditch 32 are provided on the back surface of the upper seal corner 13 of the side-edge seal 12 of the first-closing seal 9 (the surface attached to the rear door 4, and the surface in contact with the front surface of the rear door 4).

Figure 17:
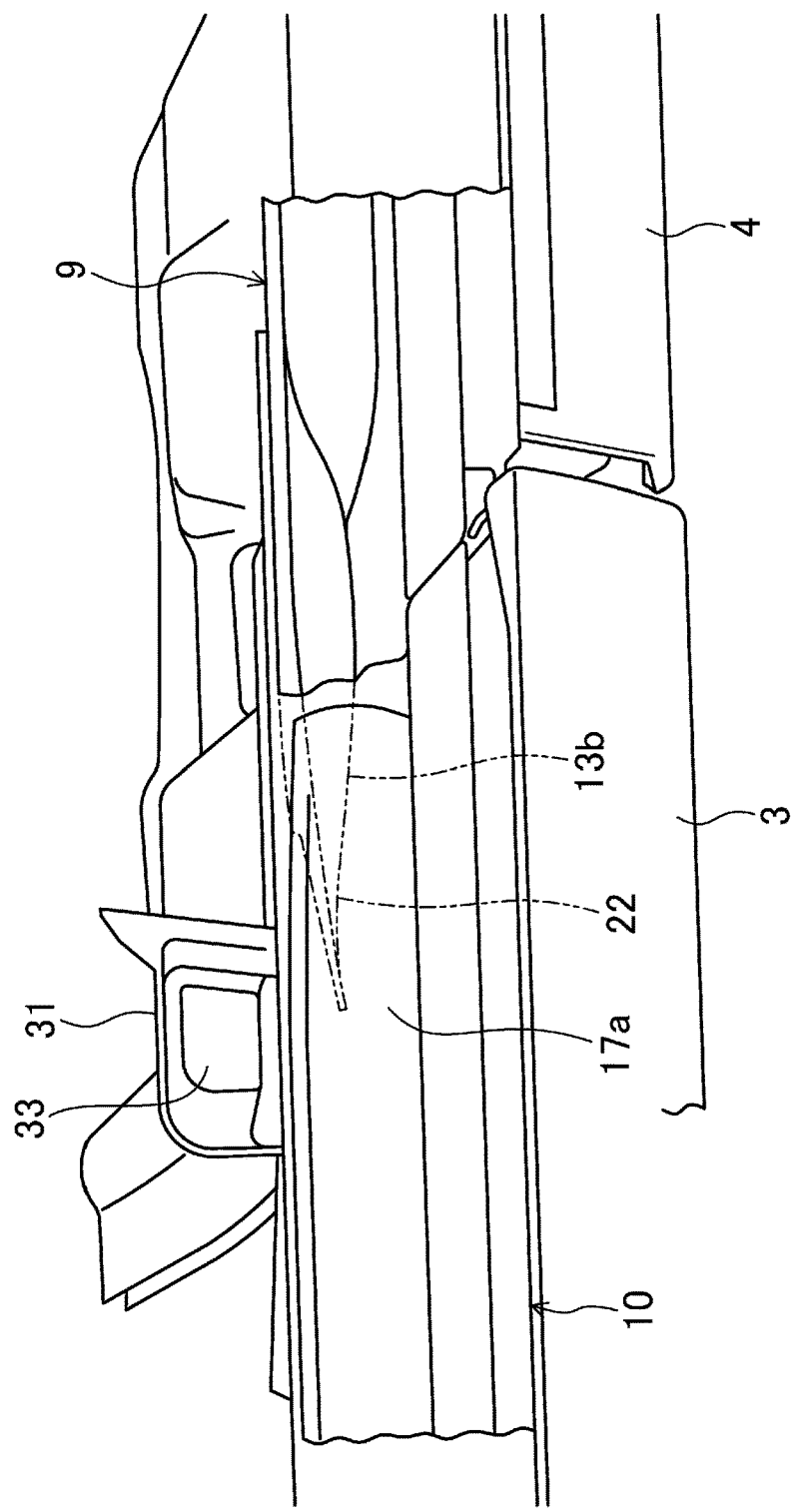
FIG. 17 is a top view illustrating part of a vehicle with front and rear doors closed (a vehicle body is not shown).

The water receiver 31 is formed of an extension extending from the intermediate seal portion 15 to the seal corner 13 above the intermediate seal portion 15. The water receiver 31 has a recess 33 that is open at the top. The recess 33 is positioned below the top of the second fin 22. As shown in FIGS. 12 and 17, when the front door 3 is closed, the water receiver 31 is positioned closer to the base end of the front door 3 than the seal portion 19D along the edge at the side of the front door 3.

Figure 18:
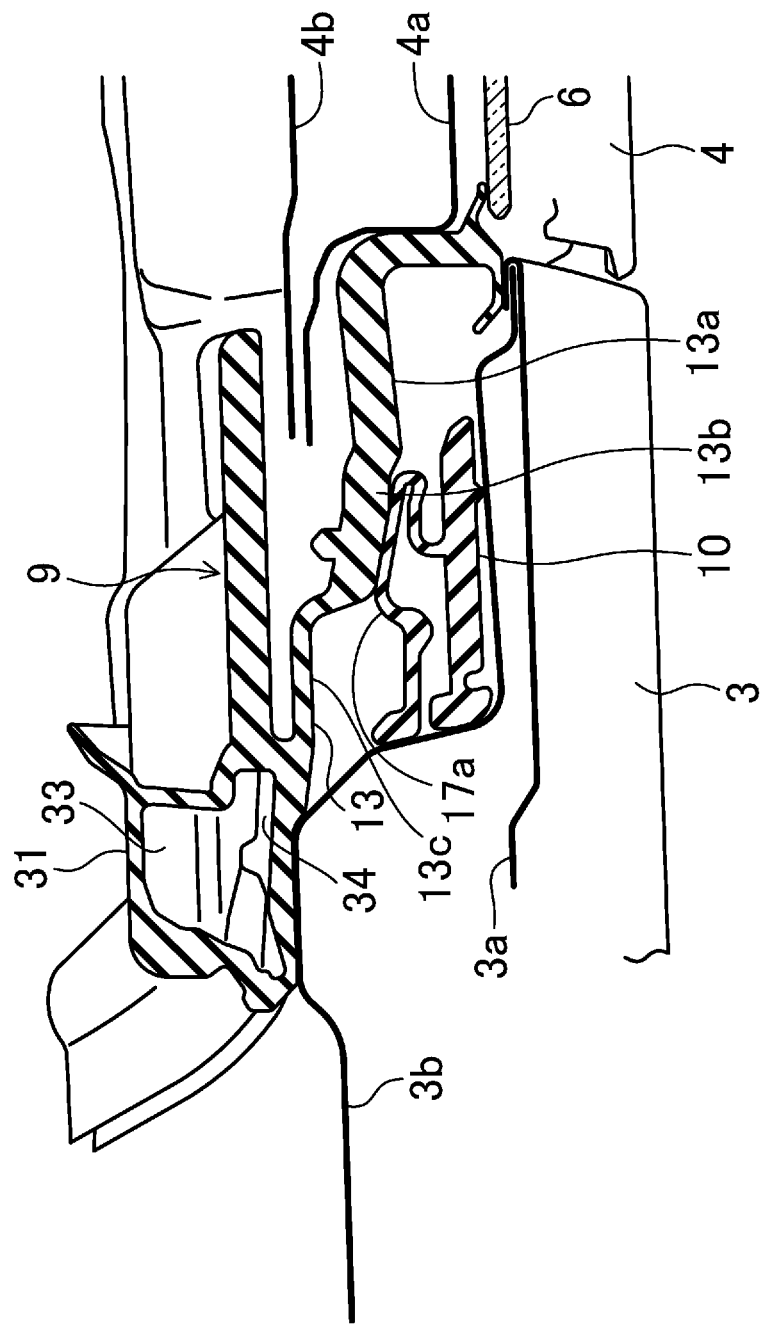
FIG. 18 is cross-sectional view taken along the line 18-18 of FIG. 2.
Figure 19:
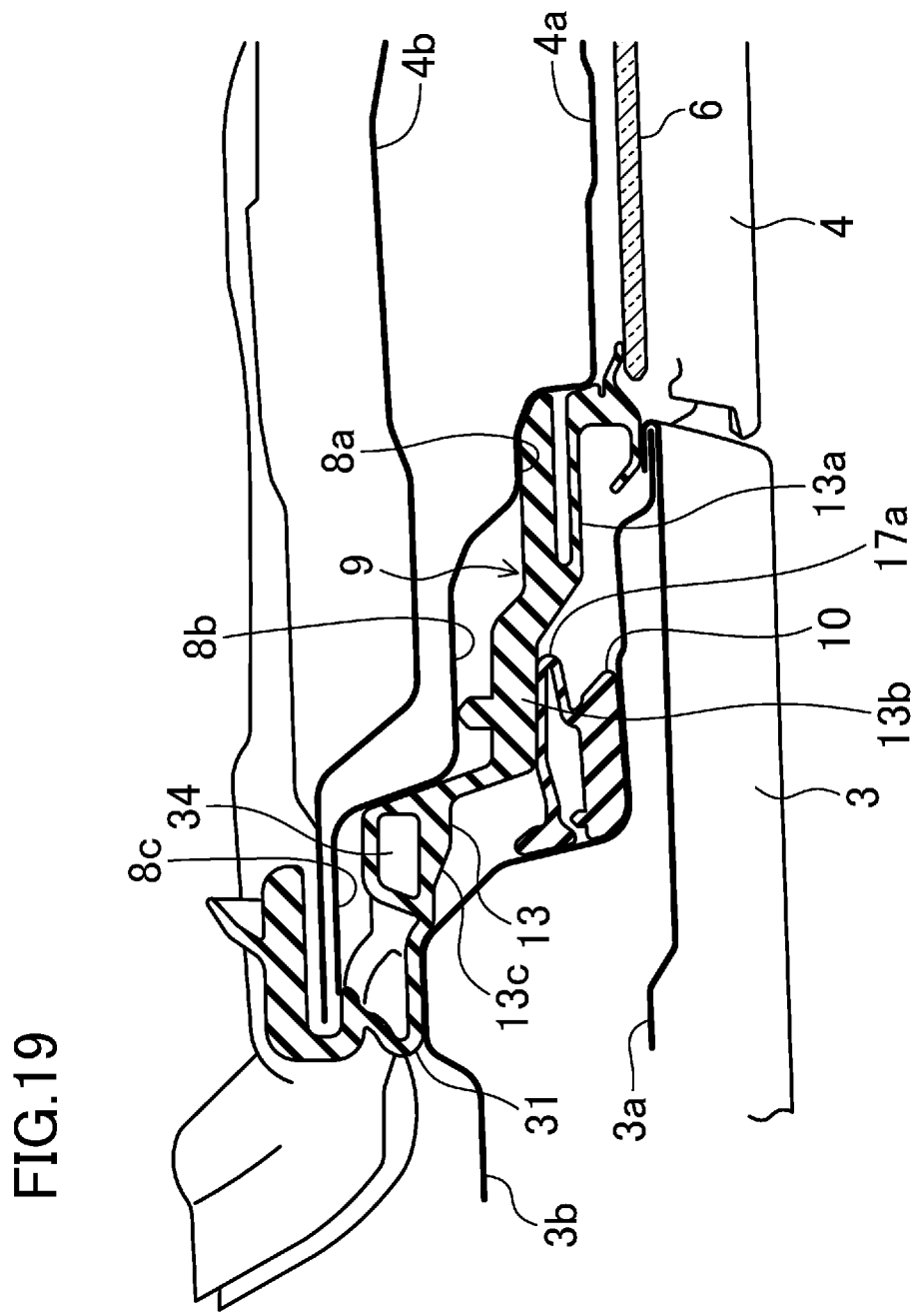
FIG. 19 is cross-sectional view taken along the line 19-19 of FIG. 2.
Figure 20:
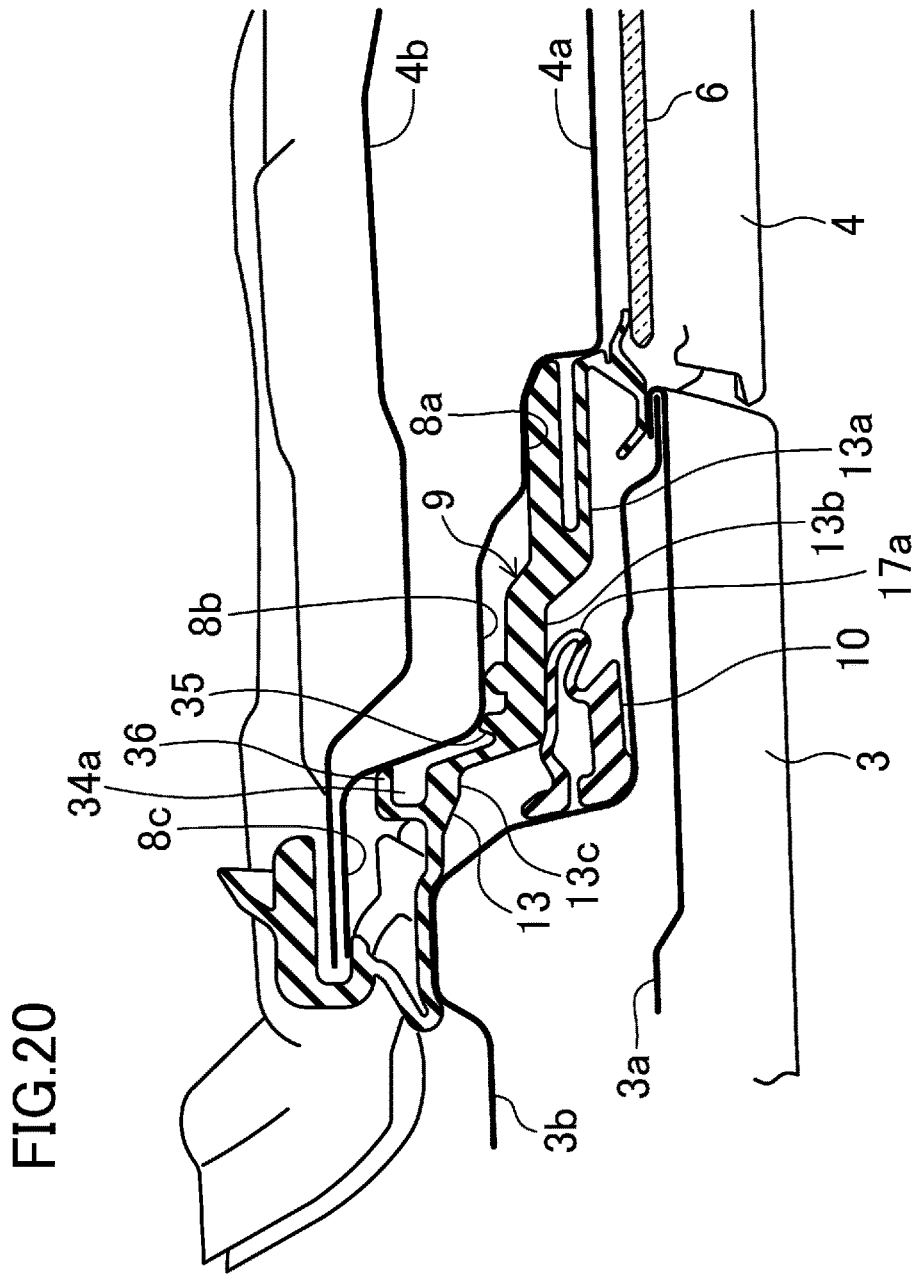
FIG. 20 is cross-sectional view taken along the line 20-20 of FIG. 2.

As shown in FIG. 12, the drainage ditch 32 includes a drain hole 34 and beads 35 and 36. As shown in FIGS. 18 and 19 as well, the drain hole 34 extends obliquely downward from the recess 33 of the water receiver 31 at the top of the top portion 13c toward the base end of the rear door 4. That is, as shown in FIG. 19, the drain hole 34 extends to the end of the intermediate portion 13b on the base end side of the top portion 13c. As indicated by an opening 34a in FIG. 20, the drain hole 34 is exposed toward the surface of the seal corner 13 attached to the rear door 4.

Figure 21:
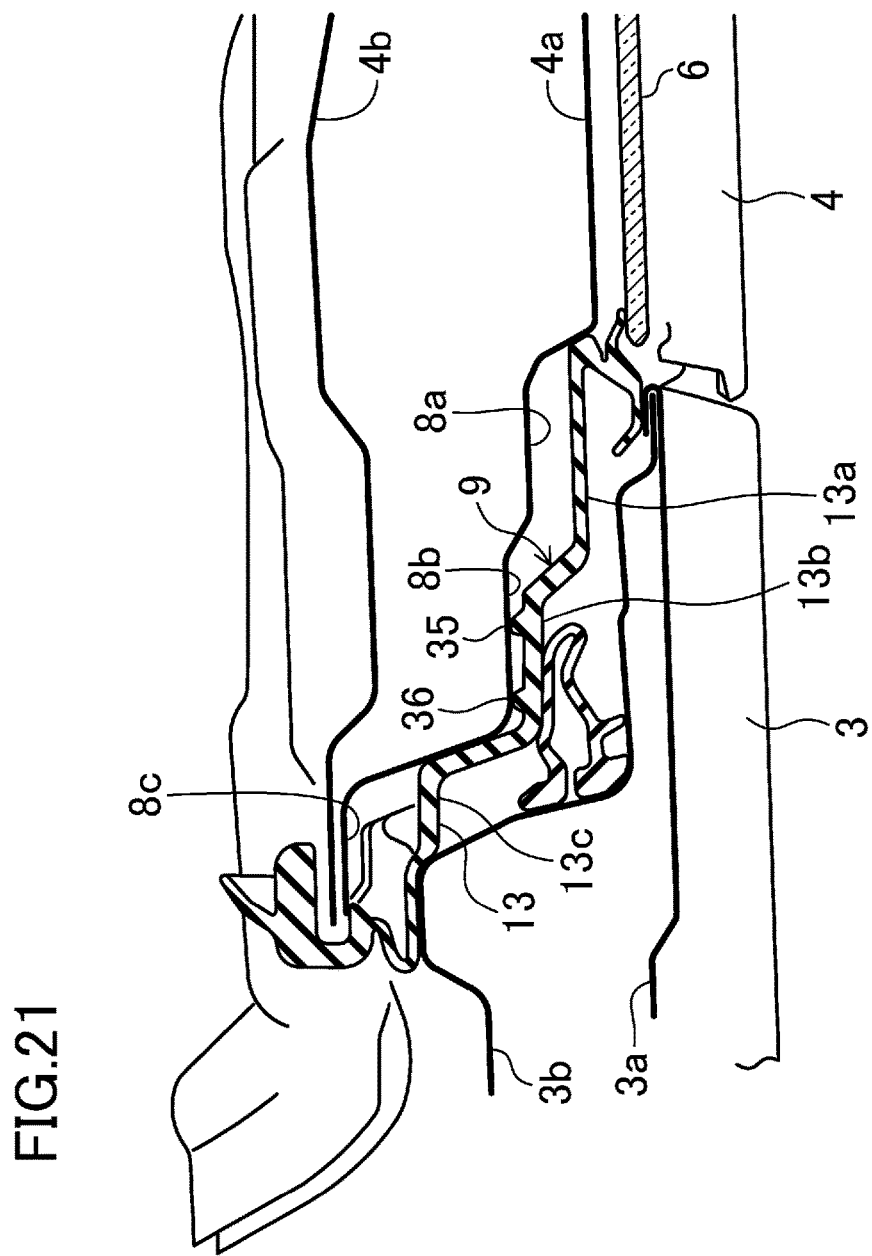
FIG. 21 is cross-sectional view taken along the line 21-21 of FIG. 2.

As shown in FIG. 12, the beads 35 and 36 are formed in the position of the intermediate portion 13b on the attached surface of the seal corner 13. The beads 35 and 36 extend obliquely downward from the lower end of the drain hole 34 toward the base end of the rear door 4 in parallel with each other (see FIGS. 20 and 21).

When the seal corner 13 is attached to the rear door 4, the beads 35 and 36 of the attached surface abut on the outer surface of the rear door 4. The attached surface, the outer surface of the rear door 4, and the beads 35 and 36 form a drainage space continuous with the drain hole 34. The lower bead 36 of the two obliquely extending beads 35 and 36 reaches the lower end of the intermediate portion 13b of the seal corner 13. The lower end of the bead 36 is positioned at the end of the base portion 13a.

Specifically, as shown in FIGS. 9 and 12, when the front door 3 is closed, the seal corner 17 of the second-closing seal 10 overlaps the intermediate portion 13b of the seal corner 13 of the first-closing seal 9. The seal corner 17 crosses over the intermediate portion 13b to come into elastic contact with the outer surface of the intermediate portion 8b of the top-side frame 8 to perform sealing. To be specific, the seal portion 19D extending to a lower portion of the seal corner 18 is in elastic contact with the outer surface of the intermediate portion 8b of the top-side frame 8. In other words, the second-closing seal 10 reaches the outer surface of the top-side frame 8 through the intermediate portion 13b of the seal corner 13 of the first-closing seal 9.

In this manner, the lower end of the bead 36 is positioned closer to the base end of the rear door 4 than the seal portion 19D. Thus, the water guided downward by the beads 35 and 36 is discharged to the outer surface closer to the base end of the rear door 4 than the seal portion 19D, that is, between the edge 8a and intermediate portion 8b of the top-side frame 8.

This reduces leakage of water into a vehicle. The leaking water drops along the top-side frame 8 of the outer surface of the rear door 4. More specifically, the leaking water drops downward along the gap between the seal portion 19D extending downward from the seal corner 17 of the second-closing seal 10 and the edge 8a of the top-side frame 8 of the rear door 4. Since the water does not enter the gap between inner and outer panels 3a and 3b of the front door 3, or the gap between inner and outer panels 4a and 4b of the rear door 4, rusting of these door panels are prevented or reduced.

What is claimed is:

1. A weatherstrip assembly of a vehicle including a vehicle body with an interior space accessible via an opening that is opened and closed using a double door assembly comprising a first-closing door and a second-closing door, the weatherstrip assembly comprising:

a body-side seal provided along an exterior-facing periphery of the opening of the vehicle body, the body-side seal being positioned adjacent and extending along a top edge of at least the first-closing door when the first-closing door is closed, the top edge being substantially perpendicular to a side edge of the first-closing door;

a side-edge seal having ends and being provided on the side edge of the first-closing door; and a second-closing seal provided along an interior-facing periphery of the second-closing door, wherein:

a first fin and a second fin are provided at at least one of the ends of the side-edge seal of the first-closing door, the first fin and the second fin both extending along the body-side seal when the first-closing door is closed, the first fin and the second fin both being spaced apart from the side edge of the first-closing door, the first fin and the second fin both extending toward the second-closing door when the first closing and the second-closing doors are closed, when the first-closing door is closed, the first fin overlaps the body-side seal such that the body-side seal is intermediate the first fin and the interior space of the vehicle body and the second fin overlaps an outer surface of the vehicle body radially outside the body-side seal, when the second-closing door is closed, an inner surface of the second-closing door abuts on the body-side seal and extends along a body of the side-edge seal of the first-closing door beyond the first fin and the second-closing seal abuts on the outer surface of the vehicle body radially outside the body-side seal and extends along the body of the side-edge seal of the first-closing door beyond the second fin, and at least tips of the first and second fins are deformed independently from each other when the second fin abuts on the outer surface of the vehicle body and the first fin is pressed and deformed by the inner surface of the second-closing door when the first-closing door and the second-closing door are both closed.

2. The weatherstrip assembly of claim 1, wherein the first and second fins are divided from each other and protrude from the body of the side-edge seal of the first-closing door to extend toward the second-closing door when the first-closing door and the second-closing door are both closed.

3. The weatherstrip assembly of claim 1, wherein a thickness of each of the first and second fins decreases toward a respective one of the tips.

4. The weatherstrip assembly of claim 1, wherein:
the side-edge seal of the first-closing door includes a water receiver and a drainage ditch; and
when the first-closing door and the second-closing door are both closed:
    an upper seal portion of the second-closing seal along an upper edge of the second-closing door abuts on the outer surface of the vehicle body,
    a side seal portion of the second-closing seal along an edge of the second-closing door abuts on the first-closing door,
    the water receiver receives water from the outer surface of the vehicle body, and
    the drainage ditch drains the water from the water receiver.

5. The weatherstrip assembly of claim 4, wherein:
the side-edge seal includes a drain hole and a bead,
the drain hole extends downward from a top portion of the side-edge seal toward a bottom of the first-closing door,
the bead is provided on a surface of the side-edge seal and extends downward from a lower end of the drain hole toward the bottom of the first-closing door,
the bead on the surface of the side-edge seal abuts on the first-closing door such that the surface of the side-edge seal, the first-closing door and the bead form a drainage space forming the drainage ditch together with the drain hole.

6. A weatherstrip assembly of a vehicle including a vehicle body with an interior space accessible via an opening that is opened and closed using a double door assembly comprising a first-closing door and a second-closing door, the weatherstrip assembly comprising:
a body-side seal provided along an exterior-facing periphery of the opening of the vehicle body, the body-side seal being positioned adjacent and extending along a top edge of at least the first-closing door when the first-closing door is closed, the top edge being substantially perpendicular to a side edge of the first-closing door;
a side-edge seal provided on the side edge of the first-closing door; and
a second-closing seal provided along an interior-facing periphery of the second-closing door,
wherein:
    the side-edge seal of the first-closing door includes a water receiver and a drainage ditch; and
    when the first-closing door and the second-closing door are both closed:
        an upper seal portion of the second-closing seal along an upper edge of the second-closing door abuts on an outer surface of the vehicle body and engages a portion of the side-edge seal of the first-closing door such that the side-edge seal is intermediate the upper seal portion and the outer surface of the vehicle body,
        a side seal portion of the second-closing seal along a side edge of the second-closing door abuts on the first-closing door,
        the water receiver receives water draining from the outer surface of the vehicle body and from a portion of the upper seal portion of the second-closing seal that engages the portion of the side-edge seal of the first-closing door, and
        the drainage ditch drains the water from the water receiver.

7. The weatherstrip assembly of claim 6, wherein:
the side-edge seal includes a drain hole and a bead,
the drain hole extends downward from a top portion of the side-edge seal toward a bottom of the first-closing door,
the bead is provided on the surface of a side-edge seal and extends downward from a lower end of the drain hole toward the bottom of the first-closing door, and
the bead on the surface of the side-edge seal abuts on the first-closing door such that the surface of the side-edge seal, the first-closing door, and the bead form a drainage space forming the drainage ditch together with the drain hole.

* * * * *